(12) United States Patent
Guiriec et al.

(10) Patent No.: US 8,374,097 B2
(45) Date of Patent: Feb. 12, 2013

(54) FAST DRX FOR DL SPEECH TRANSMISSION IN WIRELESS NETWORKS

(75) Inventors: Sebastien Guiriec, Cages sur Mer (FR); Nicolas Petit, Cagnes sur Mer (FR); Patrick Combes, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 955 days.

(21) Appl. No.: 12/266,309

(22) Filed: Nov. 6, 2008

(65) Prior Publication Data
US 2009/0201892 A1 Aug. 13, 2009

(30) Foreign Application Priority Data
Feb. 8, 2008 (EP) .................................... 08290121

(51) Int. Cl.
*H04L 1/00* (2006.01)
*H04B 7/212* (2006.01)
(52) U.S. Cl. ................... 370/252; 370/337; 370/347
(58) Field of Classification Search .................... None
See application file for complete search history.

(56) References Cited

U.S. PATENT DOCUMENTS

| 2006/0293885 | A1* | 12/2006 | Gournay et al. | 704/223 |
| 2007/0064662 | A1* | 3/2007 | Bultan et al. | 370/338 |
| 2008/0273492 | A1* | 11/2008 | Jeong et al. | 370/329 |
| 2010/0113023 | A1* | 5/2010 | Huang et al. | 455/436 |
| 2010/0118856 | A1* | 5/2010 | Krishnamurthy et al. | 370/342 |

OTHER PUBLICATIONS

3GPP, "3rd Generation Partnership Project; Technical Specification Group GSM/EDGE, Radio Access Network; Multiplexing and Multiple Access on the Radio Path (Release 7)", 3GPP TS 45.002, V7.7.0, Valbonne, France, May 2008, pp. 1-105.

* cited by examiner

*Primary Examiner* — Andrew Lee
(74) *Attorney, Agent, or Firm* — Ronald O. Neerings; Wade James Brady, III; Frederick J. Telecky, Jr.

(57) ABSTRACT

A user equipment (UE) operating in a wireless network receives a sequence of speech frames on a speech channel. The UE demodulates at least a portion of a speech frame of the sequence of received speech frames to produce a metric value. The UE discontinues processing of the speech frame and enters a low power discontinuous reception (DRX) mode if the metric value indicates absence of valid speech data, and ignores and does not demodulate at least the next remaining bursts of the speech frame after entering DRX mode.

18 Claims, 8 Drawing Sheets

FAST DRX FOR DL SPEECH TRANSMISSION IN WIRELESS NETWORKS

CLAIM OF PRIORITY UNDER 35 U.S.C. 119(a) and CROSS-REFERENCE TO RELATED APPLICATIONS The present application claims priority to and incorporates by reference European Patent Application No. EP08290121.6 filed on Feb. 8, 2008, entitled "Fast DRX For Optimized DL Power Saving in GSM Speech Dedicated Mode."

FIELD OF THE INVENTION

This invention generally relates to wireless cellular communication and in particular to receiving down-link speech transmissions in time division multiple access (TDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

The Global System for Mobile Communications (GSM: originally from Groupe Spécial Mobile) is currently the most popular standard for mobile phones in the world and is referred to as a 2G (second generation) system based on TDMA (Time Division Multiple Access) mobile air interface. W-CDMA (Wideband Code Division Multiple Access) is a type of 3G (third generation) cellular network. W-CDMA is the higher speed transmission protocol designed as a replacement for the aging 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the older TDMA signaling method of GSM networks.

In GSM, the radio subsystem is required to support a certain number of logical channels that can be separated into two categories: i) the traffic channels (TCH's); and ii) the control channels. Traffic channels (TCH's) are intended to carry either encoded speech or user data in circuit switched mode. Five general forms of traffic channel are defined:

i) Full rate traffic channel (TCH/F). This channel carries information at a gross rate of 22.8 kbit/s.
ii) Half rate traffic channel (TCH/H). This channel carries information at a gross rate of 11.4 kbit/s.
iii) Enhanced circuit switched full rate traffic channel (E-TCH/F). This channel carries information at a gross rate of 69.6 kbit/s including the stealing symbols.
iv) 8-PSK full rate traffic channel (O-TCH/F). This channel carries information at a gross rate of 68.4 kbit/s.
v) 8-PSK half rate traffic channel (O-TCH/H). This channel carries information at a gross rate of 34.2 kbit/s.

Several combinations of these traffic channels may used to transfer speech for a typical cell phone voice call, such as full rate traffic channel for speech (TCH/FS). Control channels are intended to carry signaling or synchronization data. Four categories of control channel are defined: broadcast, common, dedicated and CTS control channels. The general operation of TDMA radio access network is described in "3rd Generation Partnership Project; Technical Specification Group GSM/EDGE Radio Access Network; Multiplexing and multiple access on the radio path (Release 7)" (3GPP TS 45.002 V7.7.0, 2008-05) and in other related 3GPP specifications.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Embodiments of the invention allow decreasing power consumption of the mobile in downlink while in dedicated speech mode. Hence, it provides a new way of improving talk time by minimizing the RF reception power consumption.

The GSM system uses discontinuous transmission (DTX) to save power in the Uplink direction. DTX is based on voice activity detection to not transmit speech frames when a user is not speaking. For the downlink direction, a GSM phone continuously monitors the reception even if there is no speech transmission because some other information like FACCH (Fast Associated Control CHannel) or RATSCCH (Robust AMR Traffic Synchronized Control CHannel) can be transmitted. Embodiments of the invention provide a technique for canceling a portion of the downlink reception in case of downlink discontinuous reception (DRX) to enhance power saving.

The technique involves canceling downlink reception when it is clear that a received burst does not contain any useful data for the speech vocoder. The technique relies on an early detection of non speech transmission in downlink direction. It is based on the following steps:

Demodulation of the first burst of a speech frame.

Generation of metrics which characterize the presence of a RF signal from MODEM information (such as SNR (signal to noise ratio). PM (Power Measurement) or SD (Soft Decision).

Status is determined by comparing the derived metrics to known thresholds or statistics.

If an RF signal is detected, then the status is updated by executing a dummy burst detection.

If status is undetermined because of poor signal conditions, another burst could be taken into account (up to three).

According to the determined DRX status, a control algorithm will enable or disable the next burst reception which allows the MODEM to go into IDLE mode.

These different stages are described in more detail below with reference to the Figures in the exemplary case of a TCH/AFS (Adaptive multi-rate, Full rate Speech) traffic channel. In downlink according to the determined DRX status, speech data may be transmitted or not by the BTS. This technique can also be applied to all other traffic speech channels.

Figure 1:
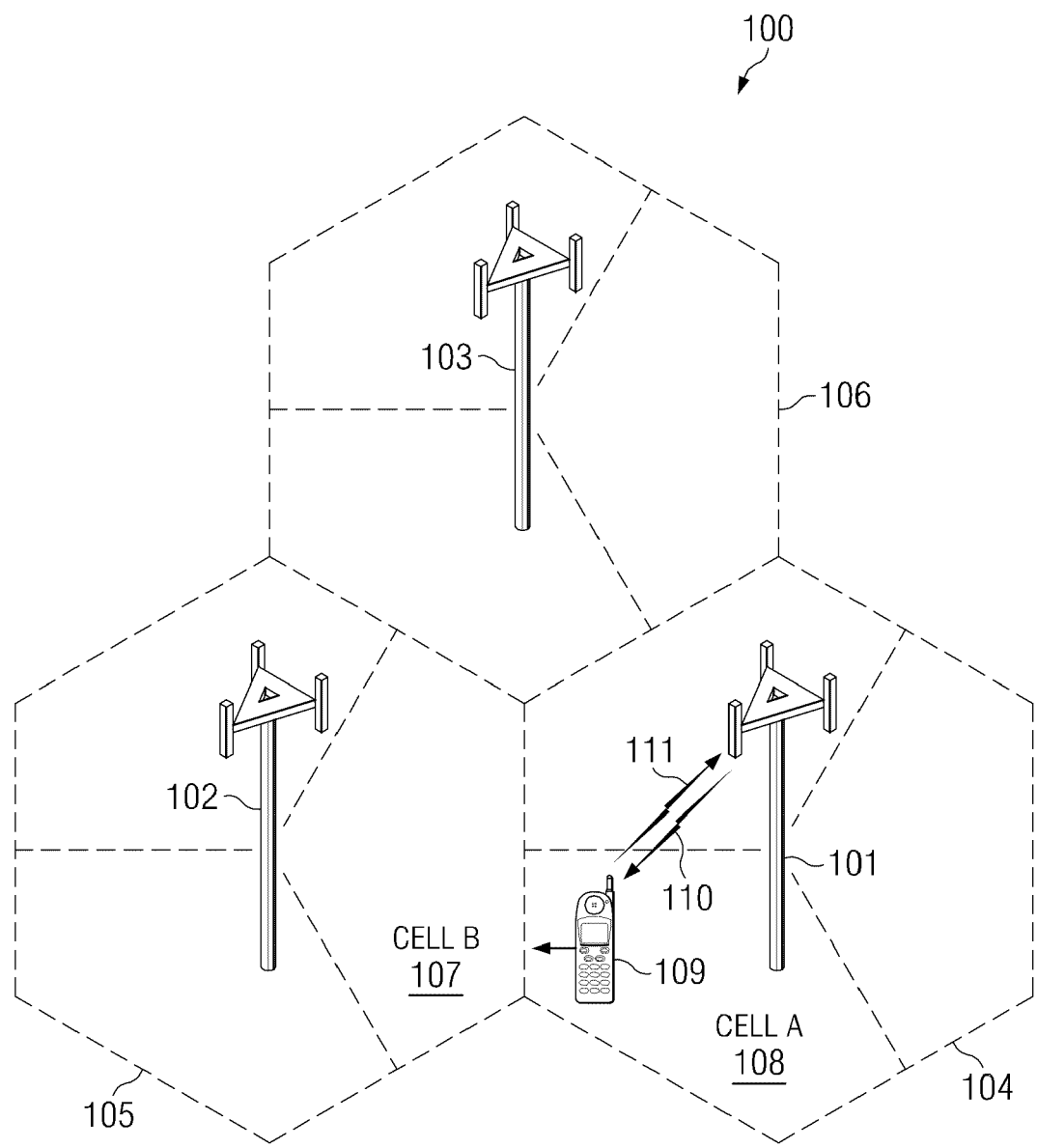
FIG. 1 is a pictorial of an illustrative telecommunications network that supports fast DRX in DL.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be handed over to base station 102.

While still in cell A 108, if UE 109 has data ready for transmission, for example, speech data, measurements report, etc., UE 109 can transmit a signal on up-link 111. UE receives transmissions of speech data and other control information on downlink 110. As discussed above and described in more detail below, while monitoring downlink 110, UE 109 may go into DRX mode on a speech frame by speech frame basis when no speech data is detected in a particular speech frame.

Figure 2:
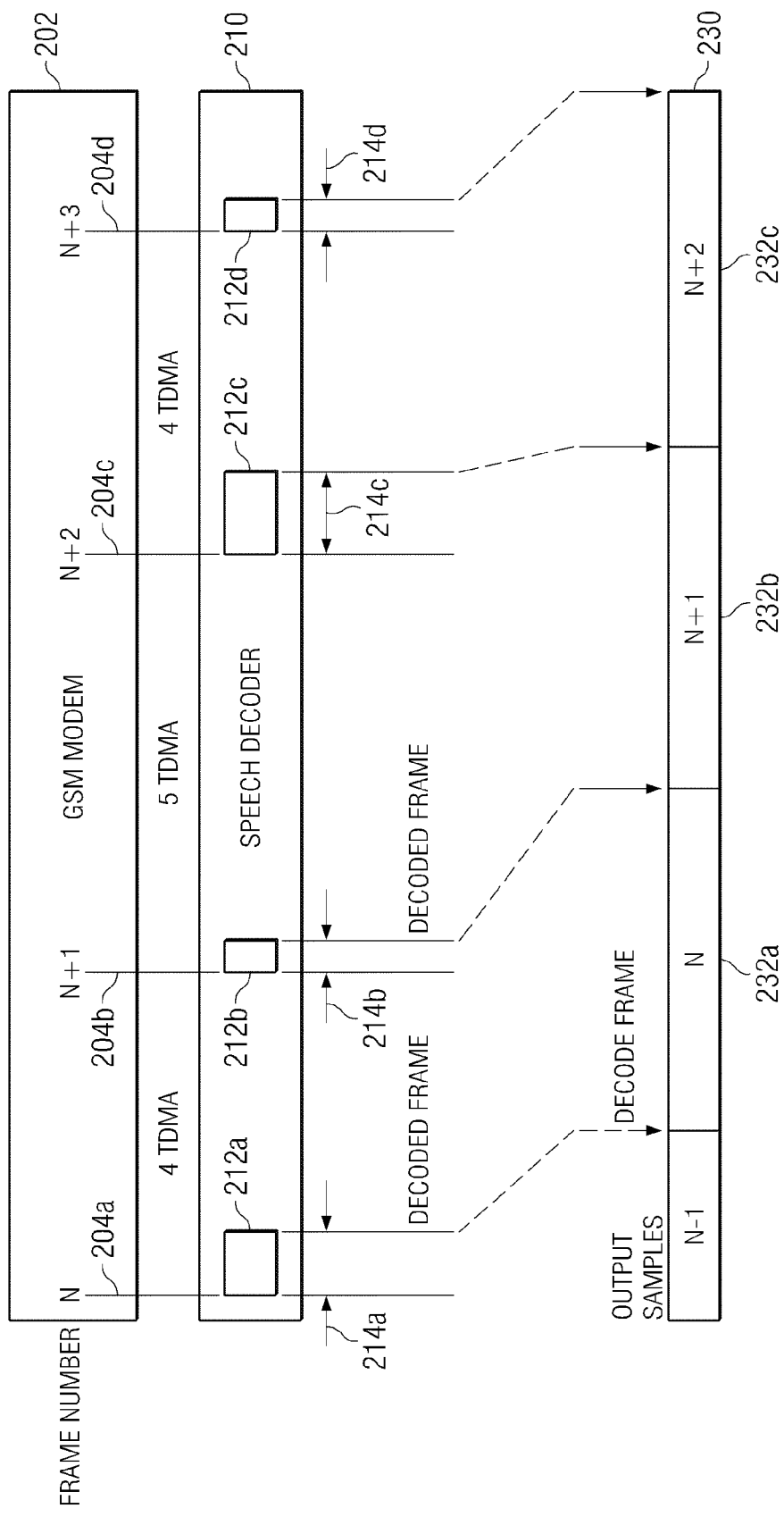
FIG. 2 is a timeline illustrating a sequence of TDMA frames forming a sequence of speech frames in a speech channel for use in the network of FIG. 1, in which fast DRX may be applied to any speech frame.

FIG. 2 is a timeline illustrating a sequence of TDMA frames forming a sequence of speech frames in a speech channel of DL 110, in which fast DRX may be applied to any speech frame. Band 202 represents a stream of encoded data frames being received at UE 109. In the GSM transmission protocol, a cyclic sequence of 13 TDMA frames (12+1 idle) is transferred. The TDMA frame is a basic time unit in GSM and is 4.615 ms long. A 13 TDMA sequence is chunked in 4, 4 and 5 TDMA frames. The result is repeating pattern of 4-4-5-4-4-5-4-4-5-... frame sequences (approximately 18.5, 18.5 and 23 ms). Thus in GSM, the encoded speech frames are delivered on downlink each 18.5, 18.5, 23 ms, even though each encoded speech frame contains 20 ms of speech. Since the speech decoder in UE 109 is switched on independently from the GSM modem, it may start with a 4-4-5, a 4-5-4 or a 5-4-4 sequence. The sequence illustrated in FIG. 2 is a 4-5-4 sequence. In WCDMA, the rhythm is regular (20 ms for each speech frame), but synchronization is required between the WCDMA modem clock and the speech decoder. Frame synch signal 204 indicates when each coded data frame is received from the GSM modem; this signal is then used by synchronization software running in UE 109. Because of the irregular 4-5-4 TDMA chunking, frame synch signal 204 occurs at an irregular rate, as indicated at 204a-d. While four occurrences of frame synch signal 204 are illustrated, it is to be understood the stream extends both before and after the representative frames illustrated herein.

Band 210 represents processing operation of the speech decoder module in cell phone 109. In this embodiment, the speech decoder module is a software module that is executed in a processor core of UE 109. In other embodiments, the decoder may be a hardware module or be software executed on a different processor core, for example. Frame processing operation 212 is performed on each encoded data frame after receipt of each frame is indicated by frame synch signal 204. Frame processing time 214 varies from frame to frame depending on factors such as complexity of each frame, acoustic signal processing, other tasks being performed by the processing core, etc. For example, frame processing time 214c is longer than frame processing times 214a-b or 214d. The decoder module decodes each encoded TDMA frame to produce a set of 160 PCM (pulse code modulated) audio data samples that represent 20 ms of speech or audio data. Other embodiments or protocols may use other defined sample rates or frame sizes, such as 80, 240, 320 etc samples/frame. 160 samples is a usual case, but frame size is 320 for AMR-WB speech which is 16 kHz PCM coded (better quality with higher sampling frequency) Indeed, the number n of samples contained in a speech frame depends on the combination of voice codec sampling frequency, usually 8000 or 16000 Hz, and frame duration which is usually 20 milliseconds, but can be 10, or other values, with n=sampling frequency*frame duration.

Band 230 represents a stream of PCM samples produced by the speech decoder. Each speech frame 232a-c represents 20 ms of speech.

Figure 3A:
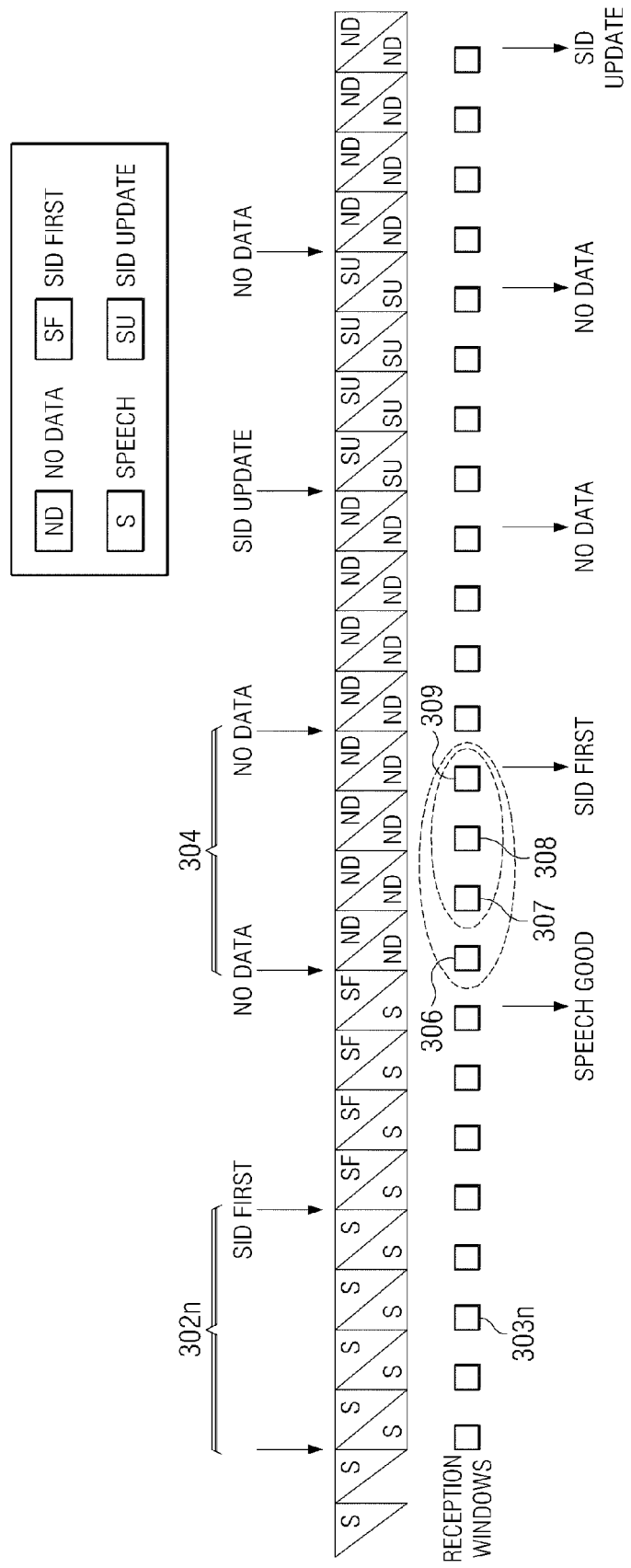
FIGS. 3A and 3B are more detailed timing diagrams of the TDMA frames of FIG. 2.
Figure 3B:
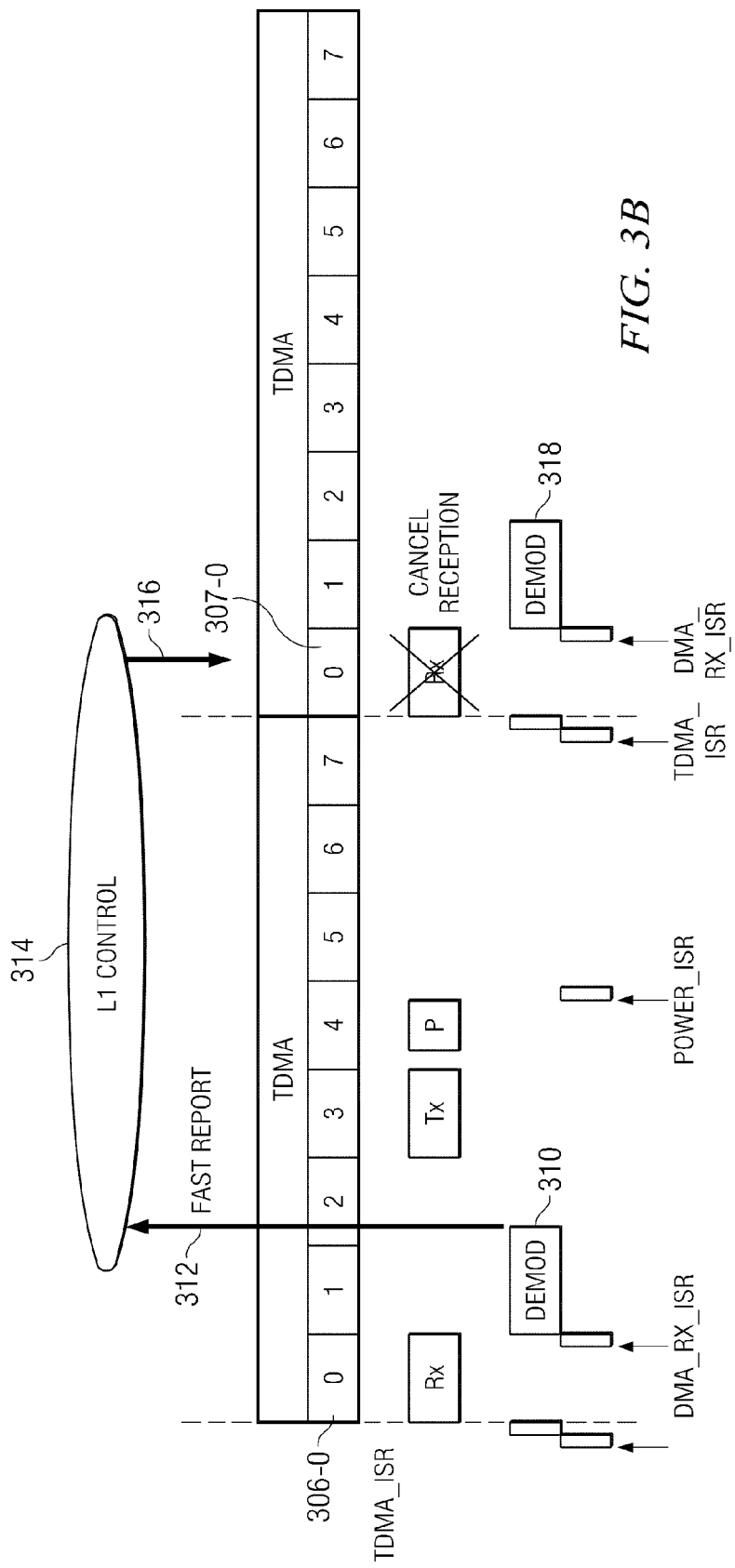

FIGS. 3A and 3B are more detailed timing diagrams of the TDMA frames of FIG. 2. As described above, each speech frame comprises four TDMA frames, as illustrated by exemplary speech frame 302n that comprises four TDMA frames generally indicated at 303n. A particular speech frame 304 comprise four TDMA frames 306, 307, 308 and 309. Note, the idle TDMA frames are not shown in this diagram.

TDMA frame 306 and 307 are illustrated in more detail in FIG. 3B. Each TDMA frame has eight TDMA slots, enumerated as 0-7. For sake of illustration, speech frame 304 will be illustrated with TDMA slot 0 assigned to UE 109, however, it should be understood that there are eight speech frames carried in parallel by each set of four TDMA frames, using one of slots 0-7, respectively. Seven other UE share this same speech channel. In this case, demodulation function 310 reports that no speech data is contained in the first TDMA slot 306-0 of speech frame 304. In response to this determination, a fast report 312 is made to layer 1 control logic 314 that the current speech frame does not contain speech data. Therefore, there is no reason to demodulate the remaining three TDMA slots and control message 316 is sent to the demodulation logic to instruct it to enter a DRX mode and stop processing, thereby saving power. Thus, slot 307-0 of the second TDMA frame and likewise the following two frames will be ignored and demodulation function 318 will not be performed in these three TDMA frames by UE 109. In this embodiment, layer 1 control logic 314 is implemented in software executed by a processor core within UE 109. In other embodiments, control logic 314 may be implemented in dedicated hardware logic, or by software executed on a different processor core within UE 109.

The operation of the seven other UE that share this speech channel proceeds according to demodulation performed separately by each UE.

Figure 4:
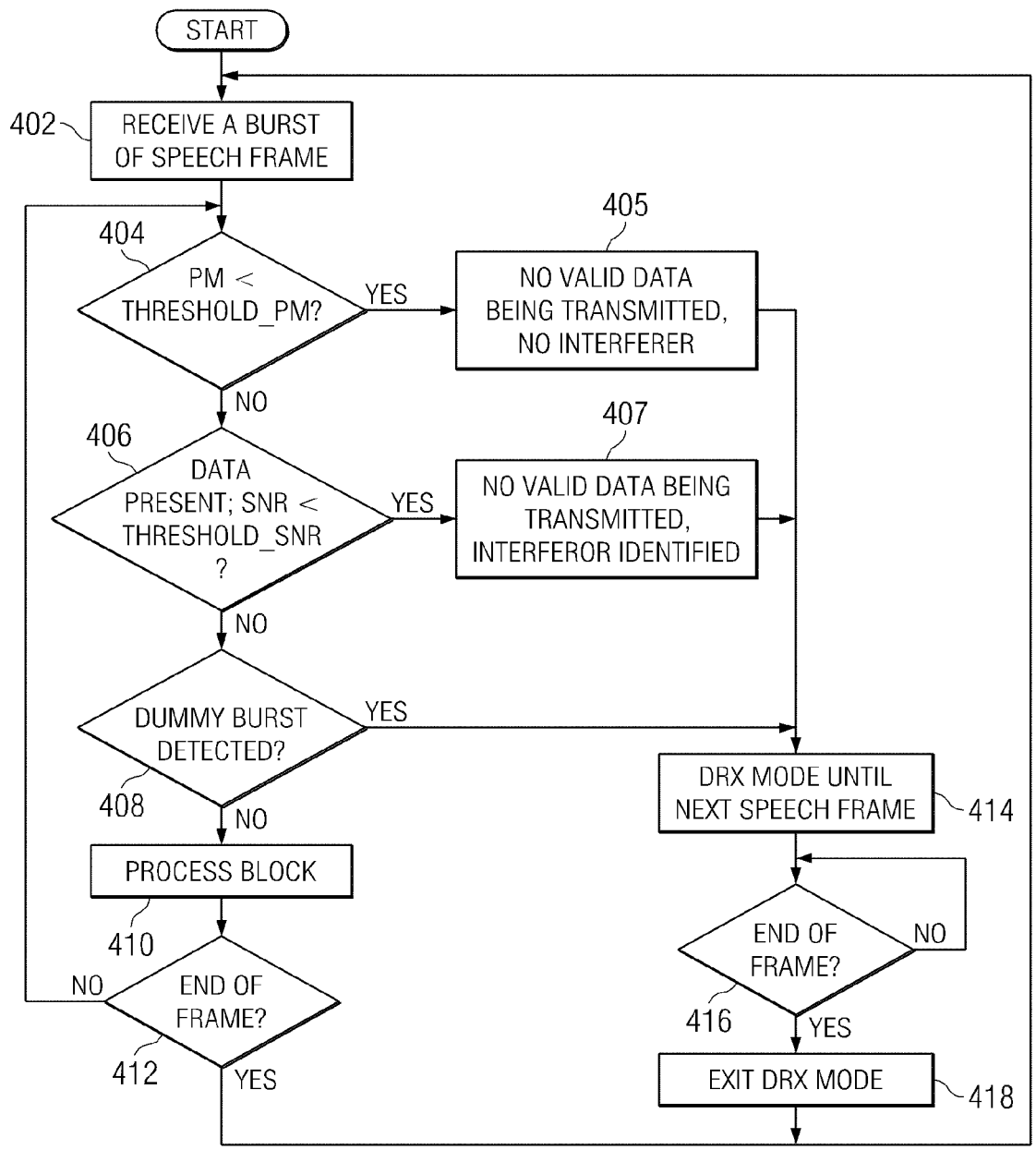
FIG. 4 is a flow diagram illustrating operation of fast DRX in the speech frames of FIG. 2.

FIG. 4 is a flow diagram illustrating operation of fast DRX in the speech frames of FIGS. 2 and 3A-3B. UE 109 is in communication with a base station serving the cell in which the UE is located. A burst of speech frame is received 402 on a downlink speech channel, in this example being a TCH/AFS channel, but other embodiments may use fast DRX power savings techniques on other types of speech channels. Recall that each speech frame is decoded every four consecutive TDMA frames.

Each received TDMA slot contains a burst of information. When the first burst is demodulated, a determination 404 is made; if PM (Power Measurement) is less than a PM-threshold value, then it may be assumed 405 that no valid data is being transmitted and that there is not an interferer that is distorting the received signal. In this case, the receiver may enter 414 DRX mode and ignore the following bursts until 416 the next speech frame. While in DRX mode, reception of the remaining RF bursts in the speech frame are cancelled to save power. Also, TCH related MODEM processing activities may be cancelled to save power. Once the beginning burst of the next speech frame is received, UE 109 exits 418 DRX mode and resumes demodulation of slot bursts.

When PM of a burst is greater than the PM threshold 404, it may be assumed that data is present; however, if the signal to noise ratio (SNR) is less than a SNR-threshold, then it may be assumed 407 that an interfering signal is causing the PM-threshold to be exceeded and that no valid data is being transmitted on this slot. Therefore, the receiver may enter 414 DRX mode and ignore the following bursts until 416 the next speech frame. Once the beginning burst of the next speech frame is received UE 109 exits 418 DRX mode and resumes demodulation of slot bursts.

Threshold_PM and Threshold_SNR are two thresholds defined and tuned in simulation in order to guarantee high FER (Frame Error Rate) performance and no speech quality degradation. In addition, the thresholds could be tuned in order to achieve a miss rate probability of $10^{-2}$ for high C/I (Channel to Interferer Ratio) range and $10^{-4}$ for low C/I range. Such a settings correspond to adapting the speech frame miss rate to the capability of the speech vocoder to cope with the loss of a frame.

When SNR of a burst is not less than threshold_SNR, then a test is performed to determine of a dummy burst is detected 408. If so, the receiver may enter 414 DRX mode and ignore the following bursts until 416 the next speech frame. Once the beginning burst of the next speech frame is received UE 109 exits 418 DRX mode and resumes demodulation of slot bursts.

If the burst is not a dummy burst, then it is assumed to be valid speech data and the block is processed 410 to form the received speech frame of PCM samples. This burst-wise process is repeated for all four bursts of each speech frame.

Occasionally, a valid DRX mode will not be detected on the first burst due to interference, but will instead be detected on the second or third burst. In this case, fast DRX mode may still be entered in order to save power.

Figure 5:
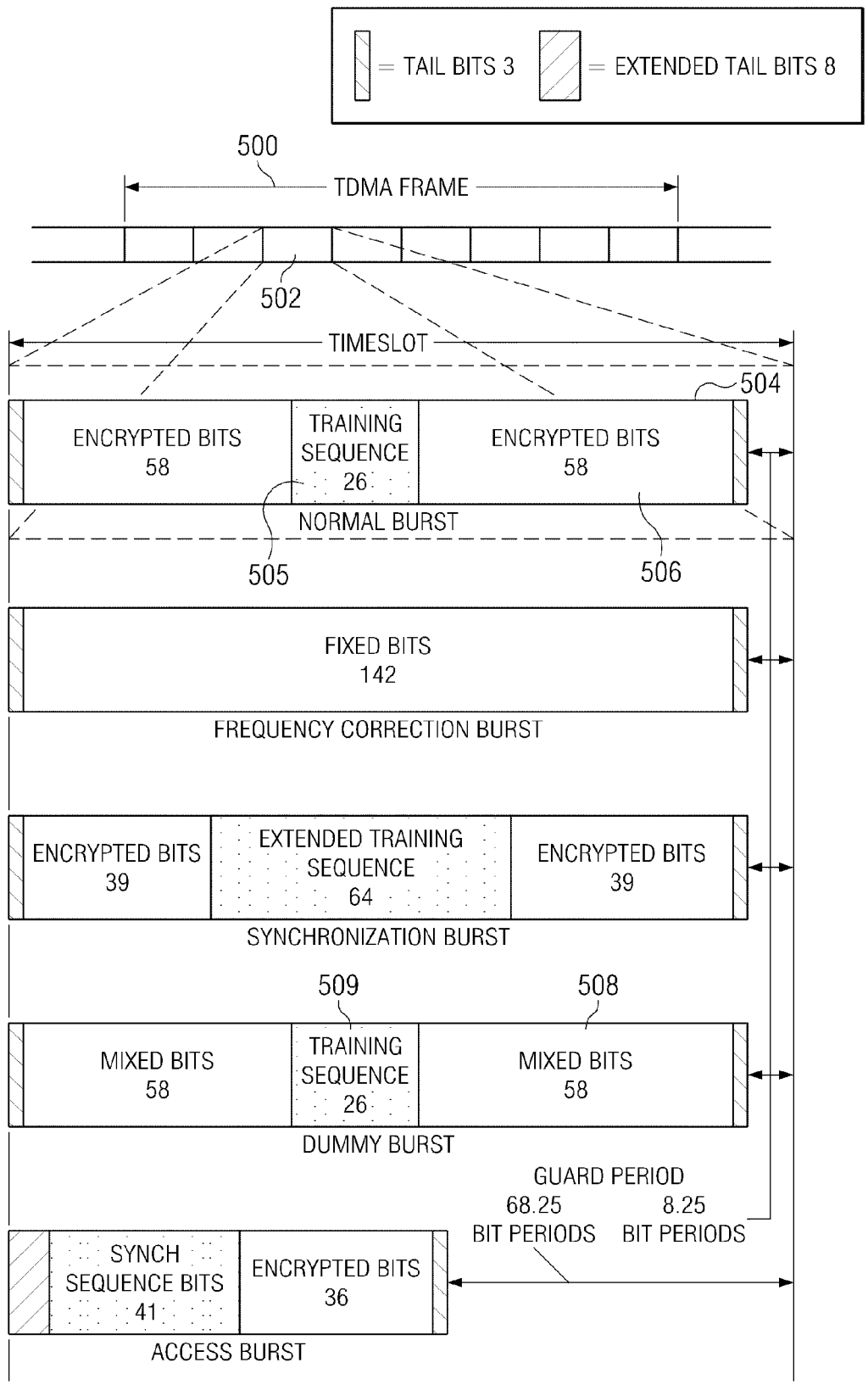
FIG. 5 illustrates various burst structures used in the TDMA frames of FIG. 2.

FIG. 5 illustrates various burst structures used in the TDMA frames of FIG. 2, as defined in the 3GPP TS 45.002 V7.7.0 specification. In particular, burst 504 is a normal burst that carries encrypted bits 506 that are used to form the PCM samples of the recovered speech frame. Training sequence 505 is detected to indicate a normal data burst. Dummy burst 508 contains training sequence 509 that can be detected to indicate a dummy burst.

There are two families of dummy bursts: TSQ (Training Sequence) independent, TSQ dependent. TSQ independent bursts do not present any TSQ and hence, the demodulator will systematically report a weak SNR which will lead to DRX mode identification. TSQ dependant dummy bursts present a TSQ like "true" normal burst. Hence, an additional correlation is required to check that data bits do not correspond to a dummy burst predefined pattern. TSQ dependant family of dummy burst is easy to identify because of the substantial number of SD (Soft Decision) available.

Figure 6:
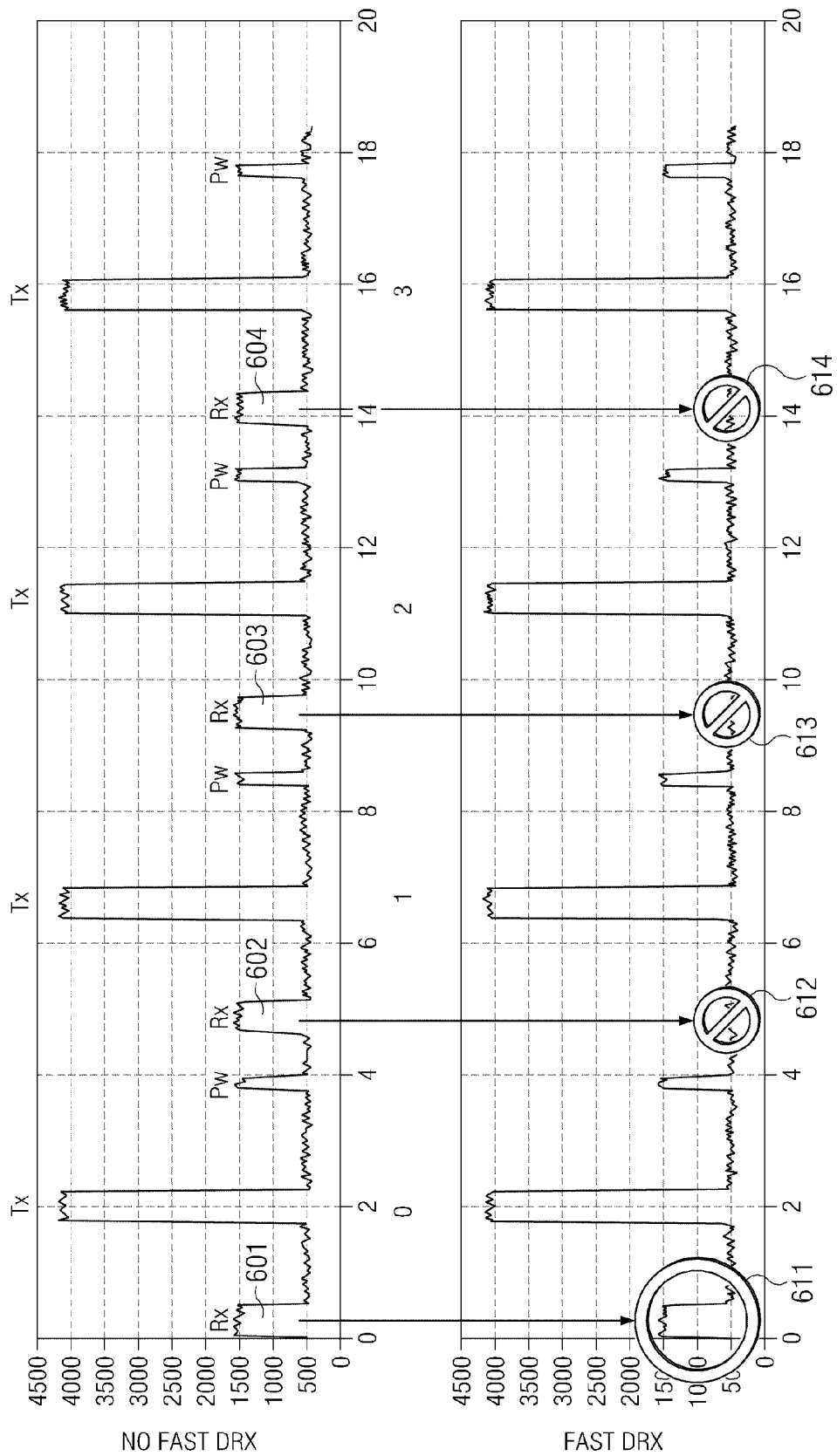
FIG. 6 illustrates power savings resulting from fast DRX.

FIG. 6 illustrates two plots of power consumption versus time to illustrate power savings resulting from fast DRX. In the first plot in which speech data is detected, receiver power is consumed to receive and demodulate a first burst as indicated at 601, a second burst as indicated at 602, a third burst as indicated at 603 and a final fourth burst as indicated at 604. In the second plot, no speech data is detected and the fast DRX mode of operation is entered for the duration of the speech frame, therefore receiver power is consumed as indicated at 611 for the first burst, but no receiver power is consumed for the remaining three bursts, as indicated at 612, 613 and 614. Note, even when fast DRX mode is entered, power will still be consumed for the power amp(Pw) and transmit path (Tx).

When discontinuous transmission is used in combination with frequency hopping the base station transmits dummy bursts on the BCCH carrier frequency (beacon carrier) when it is in DTX state. The dummy burst detection is designed to handle this case.

As an example, Table 1 provides the power consumption of an example chipset, its high level component repartition and the corresponding fast DRX saving:

TABLE 1 example power usage

| Tx Signal Strength | Power Amplifier (PA) | DRP Rx activities | DRP Tx activities | Rest of the Chipset System (Baseband) | Fast DRX saving |
| --- | --- | --- | --- | --- | --- |
| 5 dBm | 9% | 15% | 10% | 66% | ~5% (Best Case) |
| 29 dBm | 40% | 3.4% | 3% | 53.6% | ~1% (Test Case) |
| 33 dBm | 60% | 2.5% | 2% | 35.5% | ~0.5% (Worst Case) |

Assumptions:

one burst detection is assumed in good signal conditions.

Voice Activity is 50%.

TCH/(E)FR or TCH/AFS are assumed as traffic channel for voice.

Figure 7:
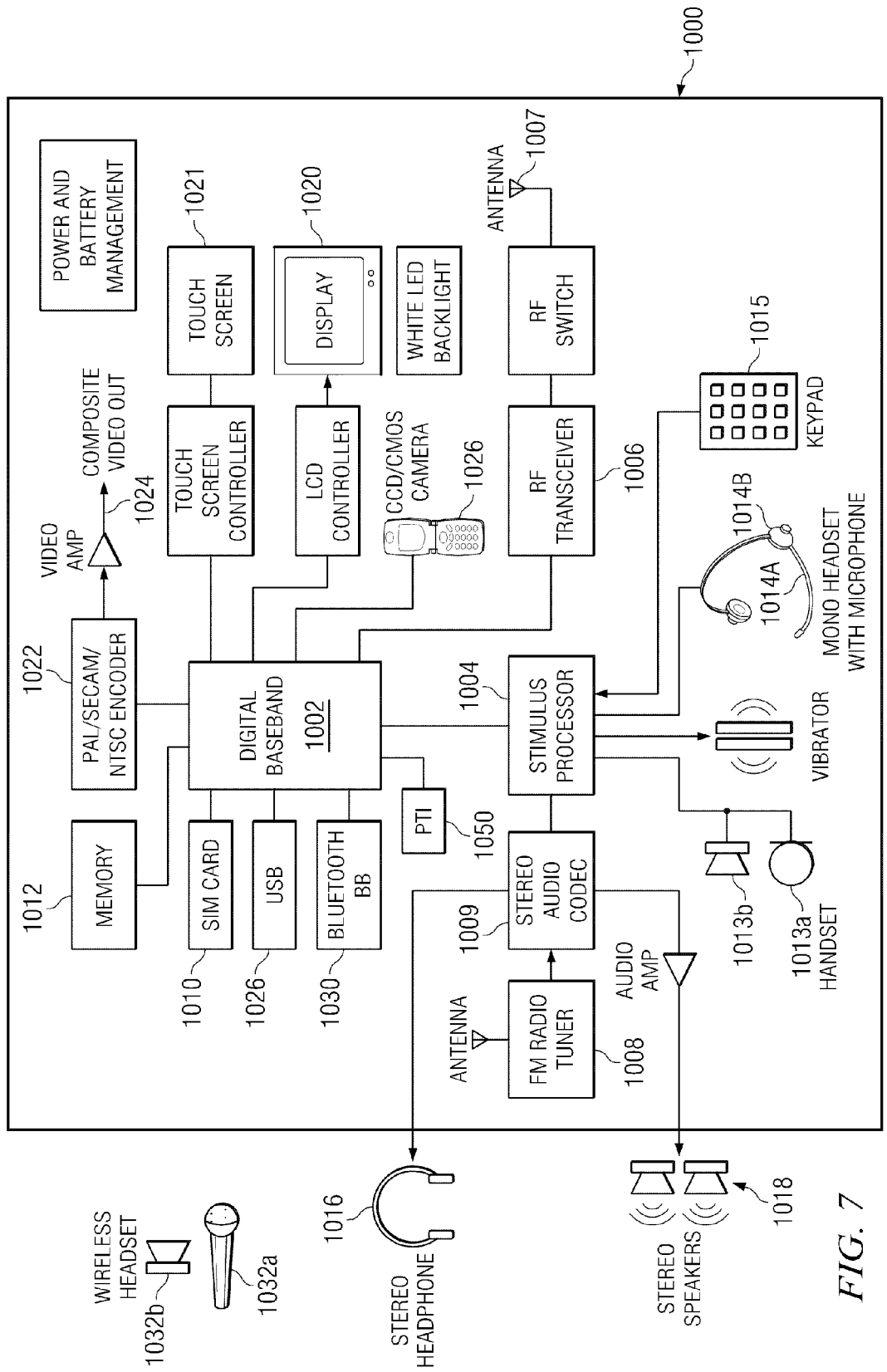
FIG. 7 is a block diagram of a cellular phone for use in the network of FIG. 1 that performs fast DRX.

FIG. 7 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. A stream of encoded data frames is received at DBB unit 1002 from RF transceiver 1006 of cell phone 1000. A GSM modem is implemented by software running on DBB 1002. Modem software controls transceiver 1006.

In this embodiment, the speech decoder module is a software module that is executed in a processor core of DBB 1002. In other embodiments, the decoder may be a hardware module or be software executed on a different processor core, for example.

Other embodiments may have transceivers for a later developed transmission standard with appropriate configuration. RF transceiver 1006 is connected to DBB 1002 which provides processing of the frames of encoded data being received and transmitted by the mobile UE unit 1000.

When no data is expected for transmission, the DBB places transceiver 1006 in a low power DTX mode. While receiving speech data, the DBB places transceiver 1006 in a low power DRX mode an speech frame basis whenever no speech data is detected for a given speech frame, as was described in more detail above.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

Other Embodiments

While the invention has been described with reference to illustrative embodiments, this description is not intended to be construed in a limiting sense. Various other embodiments of the invention will be apparent to persons skilled in the art upon reference to this description.

An exemplary use of fast DRX was described herein for a TCH/AFS (Adaptive multi-rate, Full rate Speech) traffic channel. This technique can also be applied to other types of traffic speech channels or to other types of data channels in which a portion of a multi-frame transmission that contains a data block may be unilaterally ignored based on the results of decoding a first frame of the multi-frame transmission. In another embodiment, this technique can also be applied to data channels in which a portion of a multi-packet frame that contains a data block may be unilaterally ignored based on the results of decoding a first packet of the multi-packet frame.

In another embodiment, the network may be wireless or wire based, using metallic, optical or other types of wire transmission media.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method for receiving a speech channel in a wireless network, comprising:
    receiving a sequence of speech frames on the speech channel;
    demodulating at least a portion of a speech frame of the sequence of received speech frames to produce a metric value;
    discontinuing processing of the speech frame and entering a discontinuous reception (DRX) mode if the metric value indicates absence of valid data; and
    ignoring and not demodulating at least the next remaining bursts of the speech frame after entering DRX mode.

2. The method of claim 1, further comprising exiting the DRX mode upon receipt of a next speech frame in the sequence of speech frames.

3. The method of claim 1, wherein entering DRX mode occurs if the first metric value indicates absence of a radio frequency (RF) signal.

4. The method of claim 3, wherein the metric value is a power measurement of the speech frame signal, and wherein the absence of an RF signal is indicated when the power measurement is less than a threshold value.

5. The method of claim 1, wherein the metric value is a signal to noise ratio (SNR) metric for the speech frame, wherein absence of valid data is indicated when the SNR metric value is less than a threshold.

6. The method of claim 1, further comprising discontinuing processing of the speech frame and entering DRX mode if the speech frame contains a dummy burst.

7. The method of claim 1, wherein entering DRX mode occurs if the first metric value indicates absence of a radio frequency (RF) signal, wherein the metric value is a power measurement of the speech frame signal, and absence of an RF signal is indicated when the power measurement is less than a threshold value;
    wherein when the metric value indicates presence of an RF signal, DRX mode is entered when a signal to noise ratio (SNR) metric value for the speech frame is less than a threshold; and wherein when the SNR exceeds the threshold, DRX mode is entered when the speech frame contains a dummy burst.

8. A method for receiving a data channel in a network, comprising:
   receiving a sequence of multi-packet frames on the data channel;
   demodulating a first packet of a multi-packet frame of the sequence of received multi-packet frames to produce a metric value;
   discontinuing processing of the multi-packet frame if the metric value indicates absence of valid data; and
   ignoring and not demodulating at least the next remaining packets of the multi-packet frame in response to the indication of absence of valid data.

9. The method of claim 8, further comprising resuming demodulation of the next multi-packet frame of the sequence of received multi-packet frames.

10. An apparatus for receiving a speech channel in a wireless network, comprising:
   processing logic coupled to a receiver;
   the receiver being operable to receive a sequence of speech frames on the speech channel; and
   the processing logic being operable to demodulate at least a portion of a speech frame of the sequence of received speech frames to produce a metric value, and operable to discontinue processing of the speech frame and enter a discontinuous reception (DRX) mode if the metric value indicates absence of valid data, such that at least the next remaining bursts of the speech frame are not demodulated after entering DRX mode.

11. The apparatus of claim 10, wherein the processing logic is further operable to exit the DRX mode in response to receipt by the receiver of a next speech frame in the sequence of speech frames.

12. The apparatus of claim 10, wherein entering DRX mode occurs if the first metric value indicates absence of a radio frequency (RF) signal.

13. The apparatus of claim 12, wherein the metric value is a power measurement of the speech frame signal, and wherein the absence of an RF signal is indicated when the power measurement is less than a threshold value.

14. The apparatus of claim 10, wherein the metric value is a signal to noise ratio (SNR) metric for the speech frame, wherein absence of valid data is indicated when the SNR metric value is less than a threshold.

15. The apparatus of claim 10 wherein the processing logic is further operable to discontinue processing of the speech frame and enter DRX mode if the speech frame contains a dummy burst.

16. The apparatus of claim 10, wherein entering DRX mode occurs if the first metric value indicates absence of a radio frequency (RF) signal, wherein the metric value is a power measurement of the speech frame signal, and absence of an RF signal is indicated when the power measurement is less than a threshold value;
   wherein when the metric value indicates presence of an RF signal, DRX mode is entered when a signal to noise ratio (SNR) metric value for the speech frame is less than a threshold; and
   wherein when the SNR exceeds the threshold, DRX mode is entered when the speech frame contains a dummy burst.

17. The apparatus of claim 10, wherein the processing logic comprises a processor core coupled to a memory holding instructions for execution by the processor core.

18. The apparatus of claim 17 being a cellular telephone, further comprising transmission circuitry coupled to the processing logic, and a stimulus processing unit coupled to the processing logic and to a speaker for presenting a speech data stream received by the receiver to a user.

* * * * *